United States Patent
Lin et al.

(10) Patent No.: US 6,211,868 B1
(45) Date of Patent: Apr. 3, 2001

(54) EDITING METHOD IN A MULTIMEDIA SYNCHRONOUS TRAINING SYSTEM

(75) Inventors: Benjamin Lin; Ming-Shing Su; Chung-Chih Lin; Chien-Hung Yang, all of Taipei (TW)

(73) Assignee: Infopower Taiwan Corp., Taipei (TW)

( * ) Notice: Subject to any disclaimer, the term of this patent is extended or adjusted under 35 U.S.C. 154(b) by 0 days.

(21) Appl. No.: 09/078,843

(22) Filed: May 14, 1998

(30) Foreign Application Priority Data

May 16, 1997 (TW) ................................. 86106583

(51) Int. Cl.[7] ........................................ G09B 5/06

(52) U.S. Cl. ........................................ 345/302; 434/307 R

(58) Field of Search .................................. 345/302, 150, 345/333; 434/307 R; 707/526, 529

(56) References Cited

U.S. PATENT DOCUMENTS

| | | | | |
|---|---|---|---|---|
| 5,395,243 | * | 3/1995 | Lubin et al. | 434/118 |
| 5,440,678 | * | 8/1995 | Eisen et al. | 707/537 |
| 5,600,775 | * | 2/1997 | King et al. | 345/302 |
| 5,649,234 | * | 7/1997 | Klappert et al. | 345/302 |
| 5,680,639 | * | 10/1997 | Milne et al. | 345/302 |
| 5,745,782 | * | 4/1998 | Conway | 345/302 |
| 5,802,361 | * | 9/1998 | Wang et al. | 382/217 |
| 5,833,468 | * | 11/1998 | Guy et al. | 434/350 |
| 5,838,313 | * | 11/1998 | Hou et al. | 345/302 |
| 5,898,430 | * | 4/1999 | Matsuzawa et al. | 345/302 |
| 5,903,255 | * | 5/1999 | Busch et al. | 345/150 |
| 5,977,989 | * | 11/1999 | Lee et al. | 345/503 |

OTHER PUBLICATIONS

IBM Technical Disclosure Bulletin "Operator Interface for the Creation and Control of Windows." vol. 32, No. 6B, pp. 219–223, Nov. 1989.*

Hofsetter, Fred T. "Multimedia and Internet Literacy" (Spring 1997 Course Syllabus from University of Deleware).*

Microsoft® Windows NT® Version 4.0 Display Control Panel, ©1981–1996. (screeen captures wiht captions).*

Microsoft® Windows NT® Version 4.0 CD Player, ©1981–1996. (screen captures with captions).*

Peisert, Sean. "Corel WordPerfect 3.5.2" TidBITS #359, Dec. 16, 1996.*

Metaxas, P.T. "On User Interfaces for Educational Multimedia Applications." IEEE International Conference on Multi Media Engineering Education, 1996 (held Jul. 3–5, 1996). ISBN 0–7803–3173–7. pp. 199–208.*

Chen, Lih–Shyang, et al. "Using Hypermedia in Computer–Aided Instruction." IEEE Computer Graphics and Applications, vol. 16, issue 3, May 1996. pp. 52–57.*

Cameron, Edward. "The CND Desktop Part 2."©1996.*

Pogue, David. "Let's Do Launch: Launcher—and other icon–launching pads" Macworld, Jan. 1996, p. 139.*

Lee, M.P. and Robertson, S.A. "Low Cost Hypermedia Authoring With the Microsoft Windows Multimedia Viewer Publishing Toolkit." Authoring and Application of Hypermedia–Based User Interfaces, IEEE Colloquium on, 1995.*

(List continued on next page.)

Primary Examiner—Joseph H. Feild
(74) Attorney, Agent, or Firm—Merchant& Gould P.C.

(57) ABSTRACT

A method for performing editing in a multimedia training and presentation system that substantially providing user autonomy and transparency is disclosed. The method includes inputting a basic setting used in the multimedia synchronous training system. Next, a curriculum used in the multimedia synchronous training system is input, and multimedia teaching information is then input. After inputting points of emphasis, the teaching information and the points of emphasis are synchronized. Finally, miscellaneous settings are performed in the multimedia synchronous training system.

25 Claims, 16 Drawing Sheets

OTHER PUBLICATIONS

Miller, Benjamin F. and Leonhard, Woody. "Practical Multimedia." ©1995 Ziff–Davis Publishing Company.*

Poole, Lon. "Tips, Tricks, and Shortcuts." MacWorld, Mar. 1995, p. 143.*

Heid, Jim. "Microsoft Word 6.0." (Product Review) MacWorld, Feb. 1995, p. 52.*

Brakey, Rob, and Jordan, :Lawrence. "Adobe Premiere 4.0." MacWorld, Dec. 1994, p. 53.*

Lin, Jin–Kun. "MediaMosaic—A Multimedia Editing Environment." Proceedings of the Fifth Annual ACM Symposium on User Interface Software and Technology (UIST'92, held Nov. 15–18, 1992). ©1992 ACM 0–89791–550–X/92/0011/0135.*

* cited by examiner

EDITING METHOD IN A MULTIMEDIA SYNCHRONOUS TRAINING SYSTEM

BACKGROUND OF THE INVENTION

1. Field of the Invention

The present invention relates to an editing method, and particularly to an editing method in a multimedia synchronous training and presentation system.

2. Description of the Prior Art

The advent of computer and communication brings a lot of information distributed by books, articles, audio and video media. People would be lost without a suitably auxiliary tool to efficiently learn knowledge from the information. Conventional audio/video tools such as video cassette recorders (VCRs) are used as training or presentation apparatus, in which the information of the cassettes is repeatedly and sequentially played and rewound, and therefore are easily becoming aging due to the electrical-mechanical parts resided therein.

Although multimedia computing provides tools and circumstances in facilitating training or presentation, it is still not flexible enough to completely replace the conventional apparatus such as the video cassette recorder mentioned above because of its lacking of some functions and the integration there among. For example, up to now, there is no integrated multimedia system disclosed for facilitating users or learners to take notes directly and simultaneously in a computer, from which they are learning. A need has therefore been arisen to disclose an integrated multimedia system, in which users have lots of editing tools in hand, so that the integrated multimedia system can provide all the functions found in conventional training and presentation apparatus and beyond.

SUMMARY OF THE INVENTION

In accordance with the present invention, a method is provided for performing editing in a multimedia training and presentation system that substantially provides user autonomy and transparency. In one embodiment, a basic setting used in said multimedia synchronous training system is firstly performed, and a curriculum used in said multimedia synchronous training system is then input. Next, multimedia teaching information is input, wherein the multimedia teaching information includes video and audio teaching information. Thereafter, points of emphasis are input, wherein the points of emphasis include emphasis of the multimedia teaching information. A flag representative of playing time of the multimedia teaching information is set, and the flag is then adjusted to synchronize the teaching information and the points of emphasis. Finally, miscellaneous settings are performed in the multimedia synchronous training system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
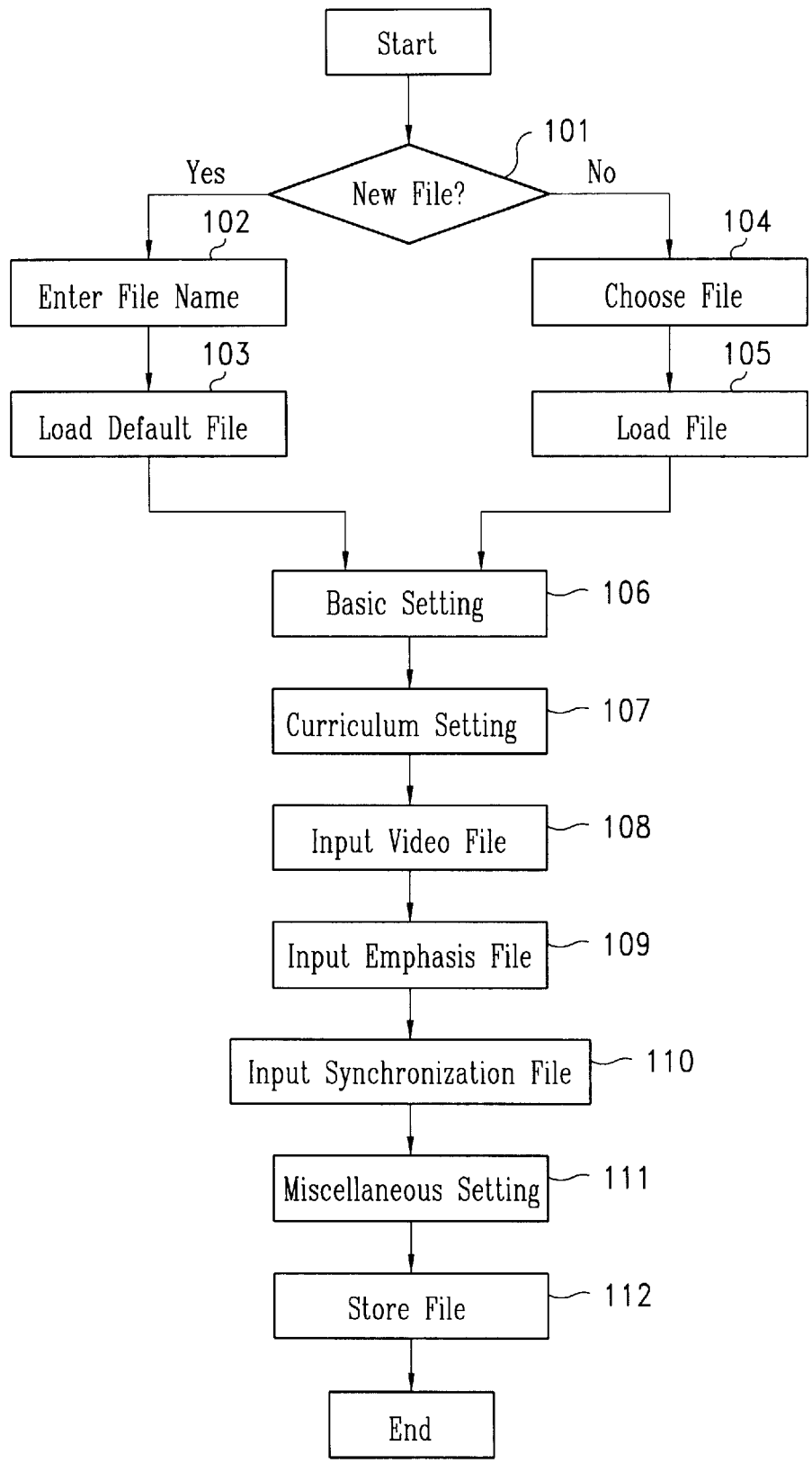
FIG. 1 shows a flow chart illustrative of an editing method in a synchronous multimedia system in accordance with one embodiment of the present invention.

FIG. 1 shows a flow chart illustrative of an editing method in a synchronous multimedia system in accordance with one embodiment of the present invention. A file under editing is determined in block 101. If the file is a new one, a file name is entered (block 102), followed by loading at least a default file (block 103), wherein some data such as icons are prepared beforehand. On the other hand, if the file under editing is an old file, the required file is firstly chosen (block 104) from a list, followed by loading the data contained in the chosen file (block 105).

After the new or old file is loaded, some basic settings, such as colors and icons, are performed in block 106. Next, curriculum setting is performed (block 107), for example, to delete, add, or move the chapters and sections of the curriculum. A file containing video information, which is referred to as video file, of the curriculum is input (block 108), and another file containing points of emphasis, which is referred to as emphasis file, wherein the points of emphasis are required to be synchronized with the aforementioned video information of the curriculum, is then input (block 109). It is appreciated that additional audio data may be contained in the file that contains video information. Afterwards, a file that contains synchronization data needed for synchronizing the data in the video file and the emphasis file is input (block 110). It is appreciated that additional settings may be further performed to fine tune the synchronization between the video file and the emphasis file. Miscellaneous settings, such as questions, examples, indications, or indexes, are further performed in block 111. Finally, the aforementioned files are stored (block 112) in a memory area in the multimedia computer after the steps mentioned above are completed.

It is appreciated that each of the steps described above in FIG. 1 may be branched back to its previous step, and the file associated in each of the steps may be promptly stored in its present step. For example, users may want to return to the block 108 to make some modification on video data while setting the emphasis file in the block 109. Further, high autonomy may be provided by allowing the users to perform some parameters in connection with each step.

Figure 2A:
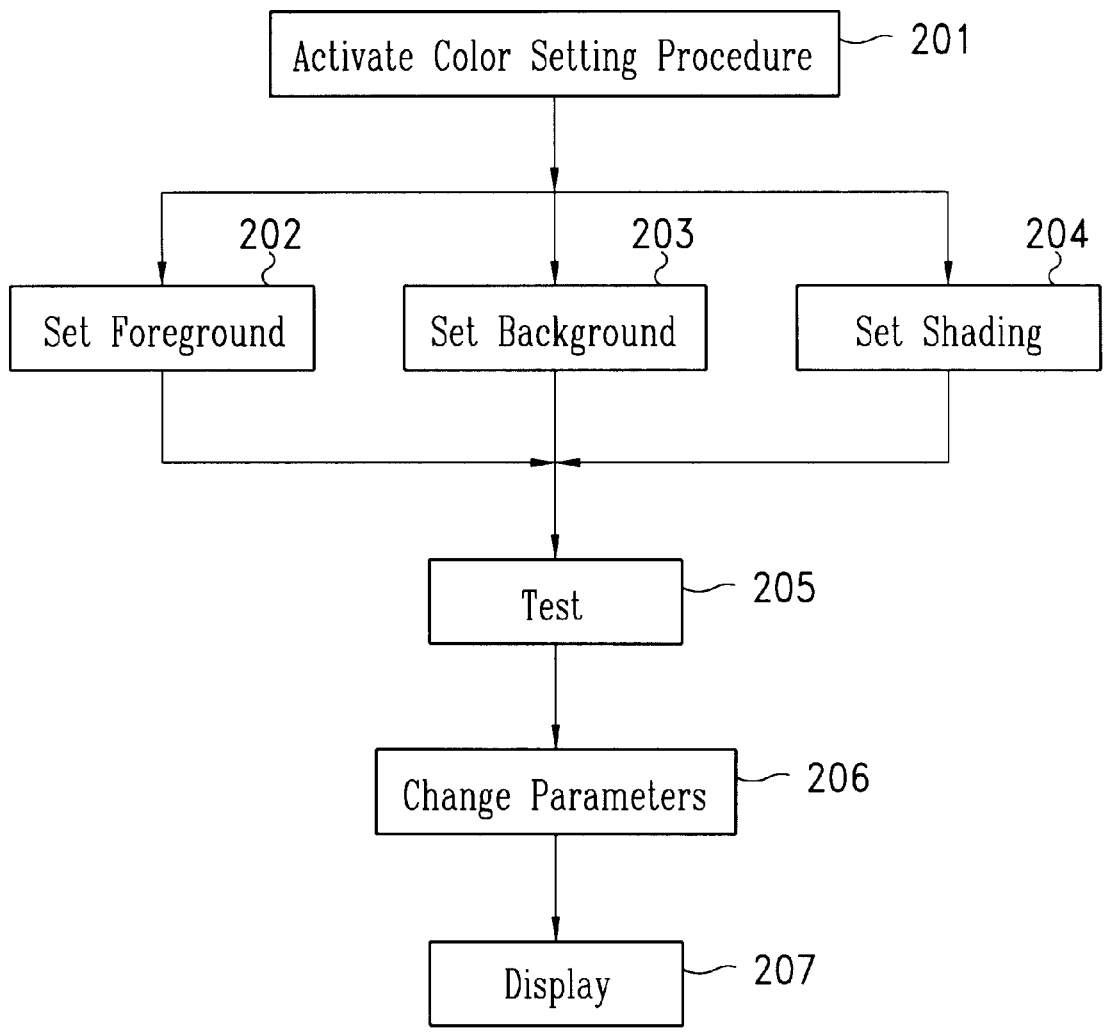
FIG. 2A shows a flow diagram further illustrating the color settings in the step representative of the block 106 in FIG. 1.

FIG. 2A shows a flow diagram further illustrating the color settings in the step representative of the block 106 in FIG. 1. After a color setting procedure is activated (block 201), the color of a foreground (such as a button), background, or shading (such as the shading around windows) may be set when required respectively in block 202, 203, or 204, immediately followed by a test or preview (block 205). The editing method of the multimedia training or presentation system according to the present invention further allows users to change some associated parameters, such as color tone, saturation, contrast, or brightness in block 206. The resulting setting is schematically displayed for users' reference (block 207).

Figure 2B:
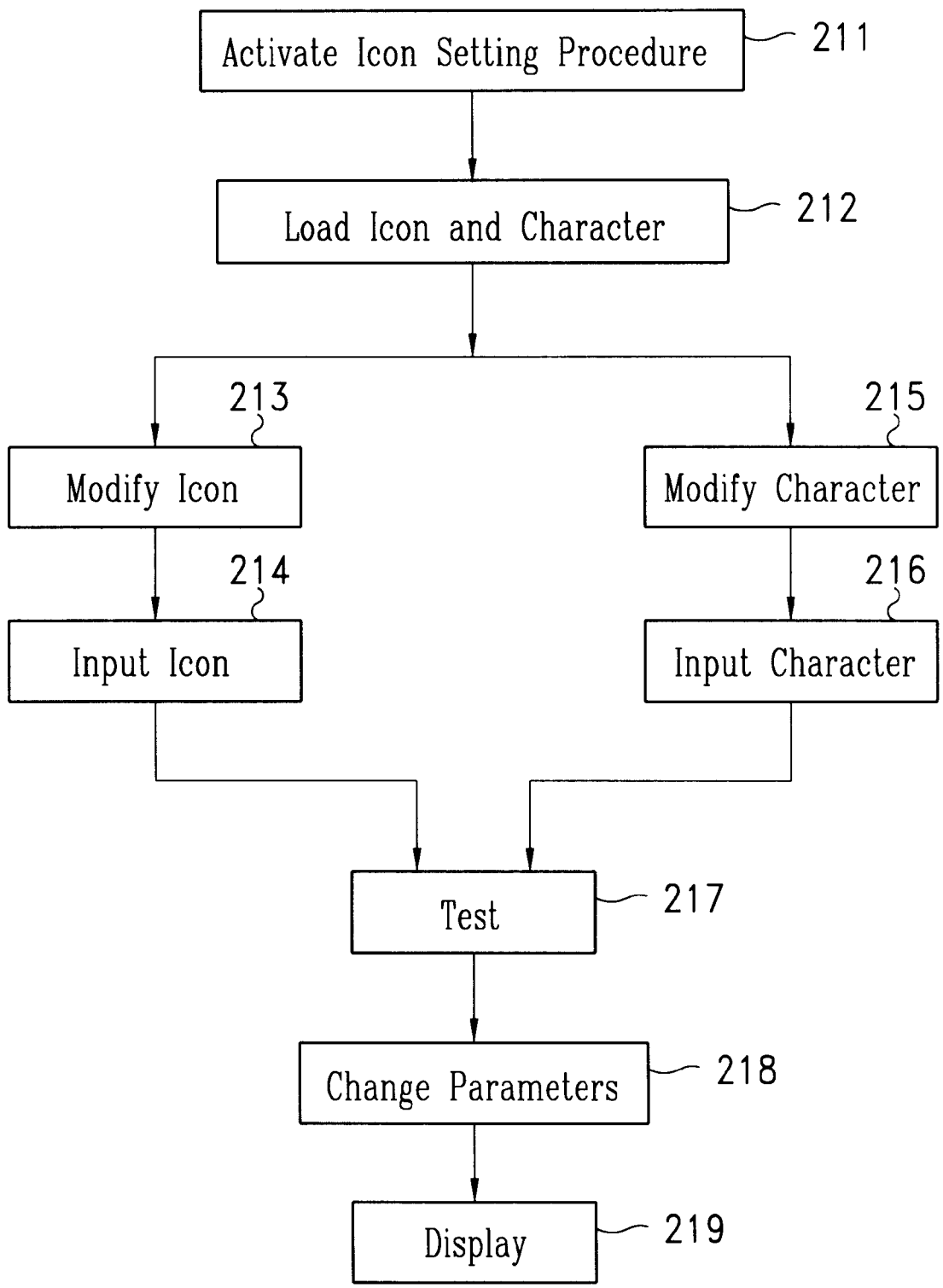
FIG. 2B shows a flow diagram further illustrating the icon and prompt windows (or bubble) settings in the step representative of the block 106 in FIG. 1.
Figure 2C:
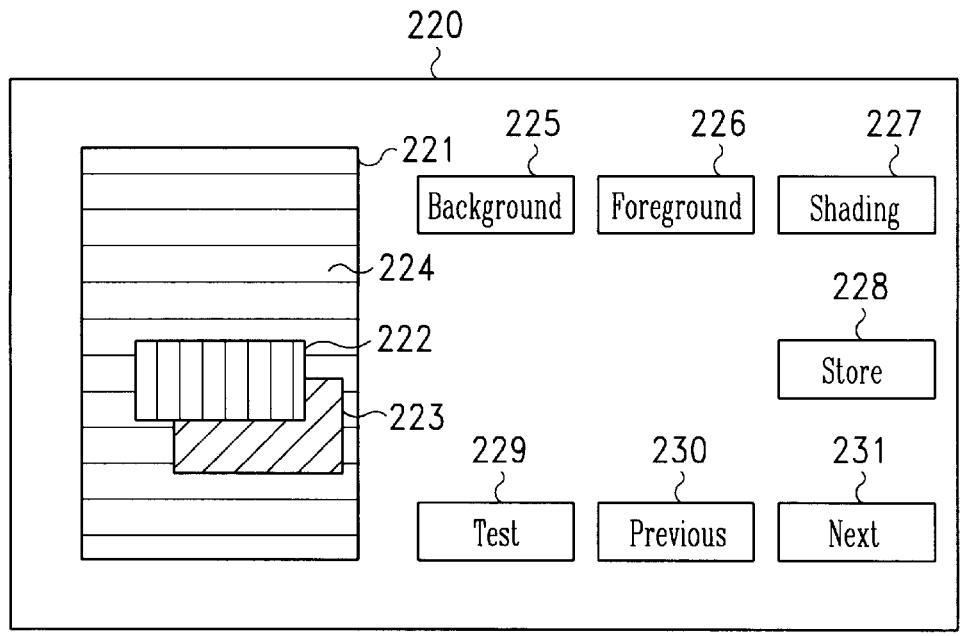
FIG. 2C schematically depicts an exemplary user interface.

An exemplary user interface is schematically depicted in FIG. 2C. When the setting in FIG. 2A is being performed, a user interface 220 is opened. The interface 220 includes a color preview area 221 for displaying the color of foreground 222, shading 223, background 224 or their combination. The interface 220 further includes some buttons, such as a "background" button 225 for setting the background color, a "foreground" button 226 for setting the foreground color, a "shading" button 227 for setting the shading color, a "store" button 228 for initiating a storing function, a "test" button 229 for testing or displaying according to the settings of the "background" button 225, the "foreground" button 226, and the "shading" button 227. Moreover, a "previous" button 230 is provided for returning to the previous setting step, and a "next" button 231 is utilized for moving to the next setting step.

Figure 2D:
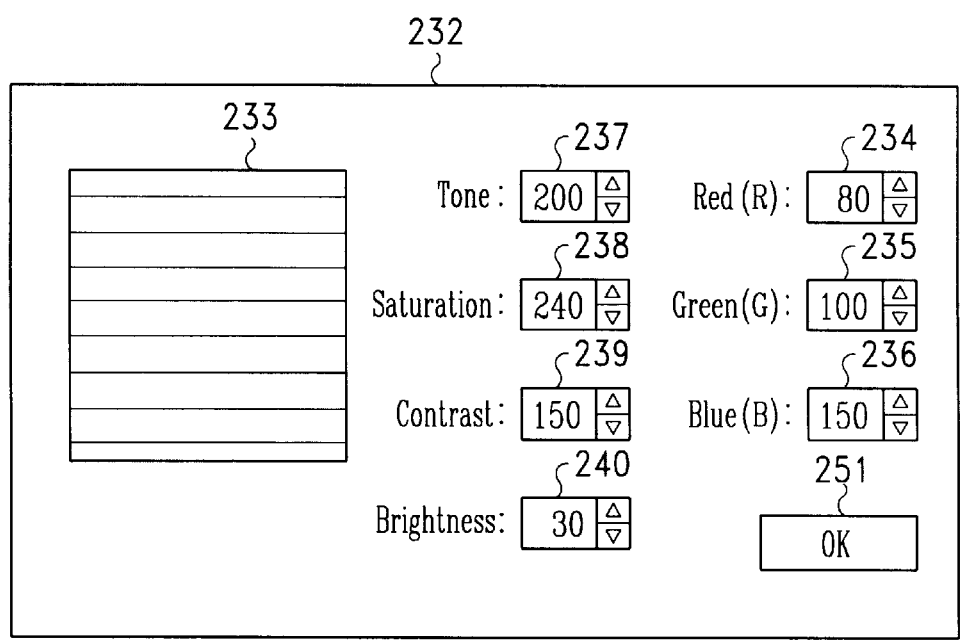
FIG. 2D schematically depicts an interface used for further setting colors.

Schematically depicted in FIG. 2D is an interface used for further setting colors. Associated color interface 232 is displayed or popped up after one of the "background" button 225, the "foreground" button 226, and the "shading" button 227 in FIG. 2C is selected. This color interface 232 includes a color display area 233. The data input areas 234, 235, and 236 are used respectively for determining compositional ratio of red, green, and blue colors. Areas designated as "color tone" 237, "saturation" 238, "contrast" 239, and "brightness" 240 are used for other related settings, which are apparent by their designations. After the "OK" button 251 is selected, the interface shown in FIG. 2C is resumed.

FIG. 2B shows a flow diagram further illustrating the icon and prompt windows (or bubble) settings in the step representative of the block 106 in FIG. 1. After an icon setting procedure is activated (block 211), the icons or characters of the prompt windows are loaded (block 212). If the file under editing is a new file, default icons and characters are loaded, and the default parameters are then modified when necessary. On the other hand, stored icons or characters are loaded when the file under editing is an old one. The modifications of the icons and the characters are performed respectively in block 213 and 215. The icons may be modified (block 214) by covering directly on an existent icon, or modifying on the icons partially. The characters are preferably edited (block 217) in a normal input manner. After the icons or the characters are edited, a test (block 217) is performed. Some associated parameters, such as the position of the icons or the font type and size of the characters, may be changed when necessary in block 218. Finally, the resulting setting in FIG. 2B is schematically displayed for users' reference (block 219).

Figure 2E:
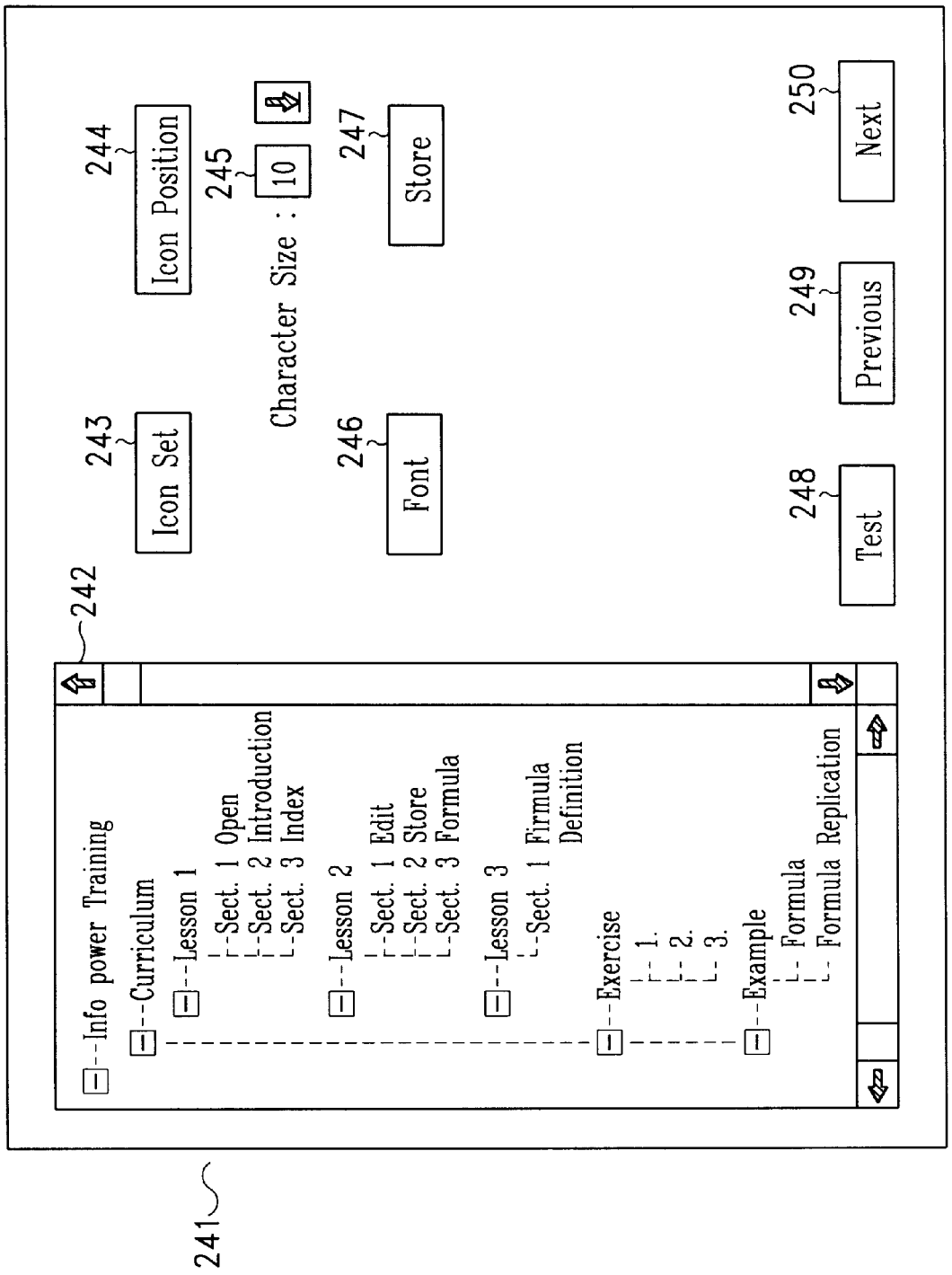
FIG. 2E shows an exemplary interface used for setting icons and prompt windows in connection with FIG. 2B.

FIG. 2E shows an exemplary interface used for setting icons and prompt windows in connection with FIG. 2B. This interface 241 is displayed after the icon setting procedure is activated (block 211, FIG. 2B), and includes an area 242 showing curriculum content. When an "icon set" button 243 is selected, another interface is popped up for choosing required icons used in the curriculum. Similarly, when an "icon position" button 244 is selected, an interface is popped up for adjusting the position of the icons displayed in the area 242. An area designated as "character size" 245 is used to select the size of the characters, and an area designated as "font" 246 is used to select one of available fonts. The "test" button 248 is used for triggering a test, which may be repeatedly performed until a satisfied result is met. A "store" button 247 initiates a storing function. Moreover, a "previous" button 249 is provided for returning to the previous setting step, and a "next" button 250 is utilized to move to the next setting step.

Figure 3A:
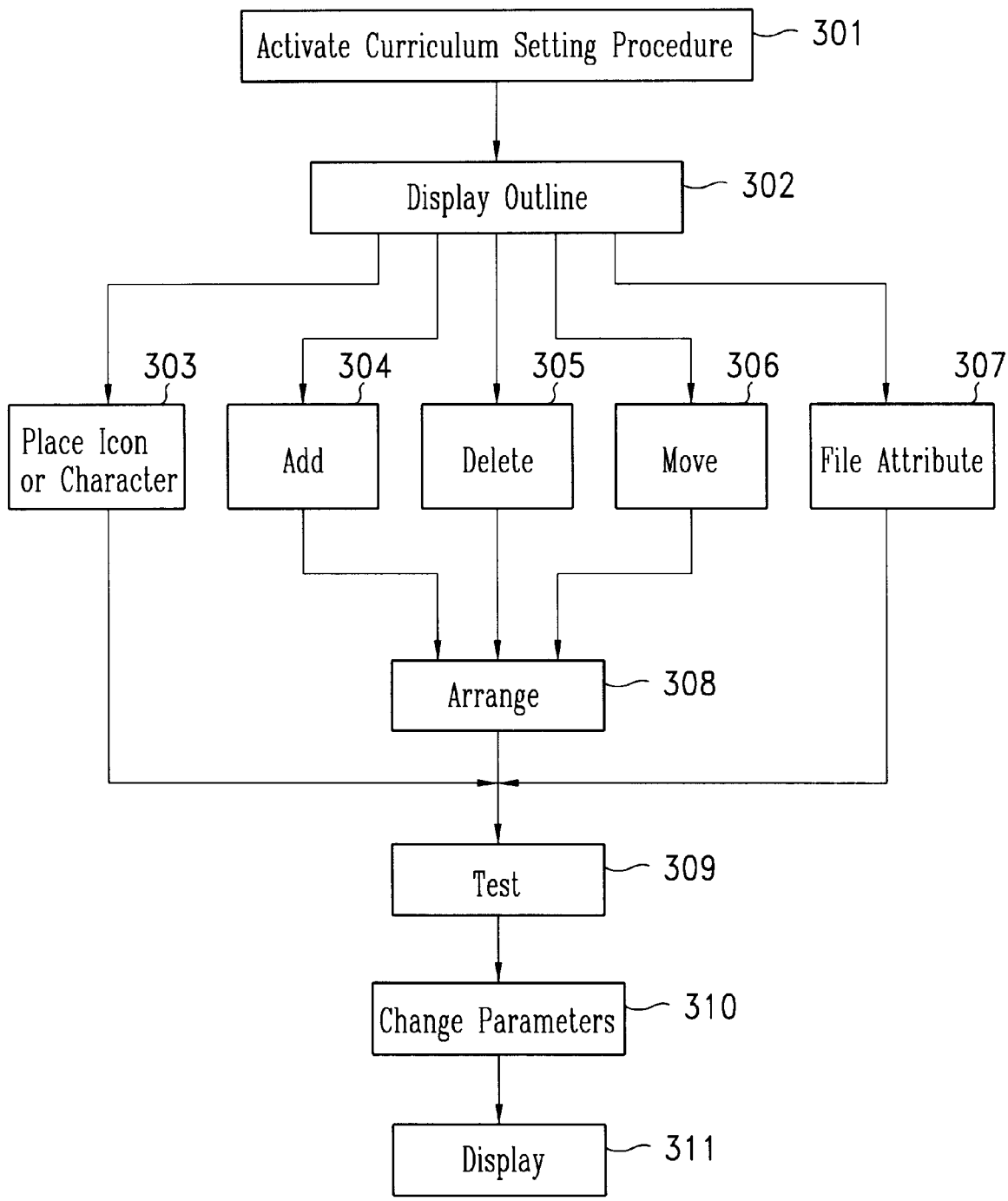
FIG. 3A shows a flow diagram further illustrating the curriculum setting in the step representative of the block 107 in FIG. 1.

FIG. 3A shows a flow diagram further illustrating the curriculum setting in the step representative of the block 107 in FIG. 1. After a curriculum setting procedure is activated in block 301, a default or stored outline of content is displayed (block 302). Next, appropriate icons or characters are placed in a suitable position (block 303), and the attribute of the file is set as character (block 307), wherein the icons mentioned above are generated from the steps in connection with FIG. 2B, replicated from the default icons or from other application programs. Furthermore, section of the content outline may be added (block 304), deleted (block 305), or moved (block 306), followed by arranging the content of the curriculum (block 308). A test or preview is subsequently performed (block 309), and when necessary, related parameters such as position, size or range may be modified (block 310), followed by displaying the resulting setting (block 311).

Figure 3B:
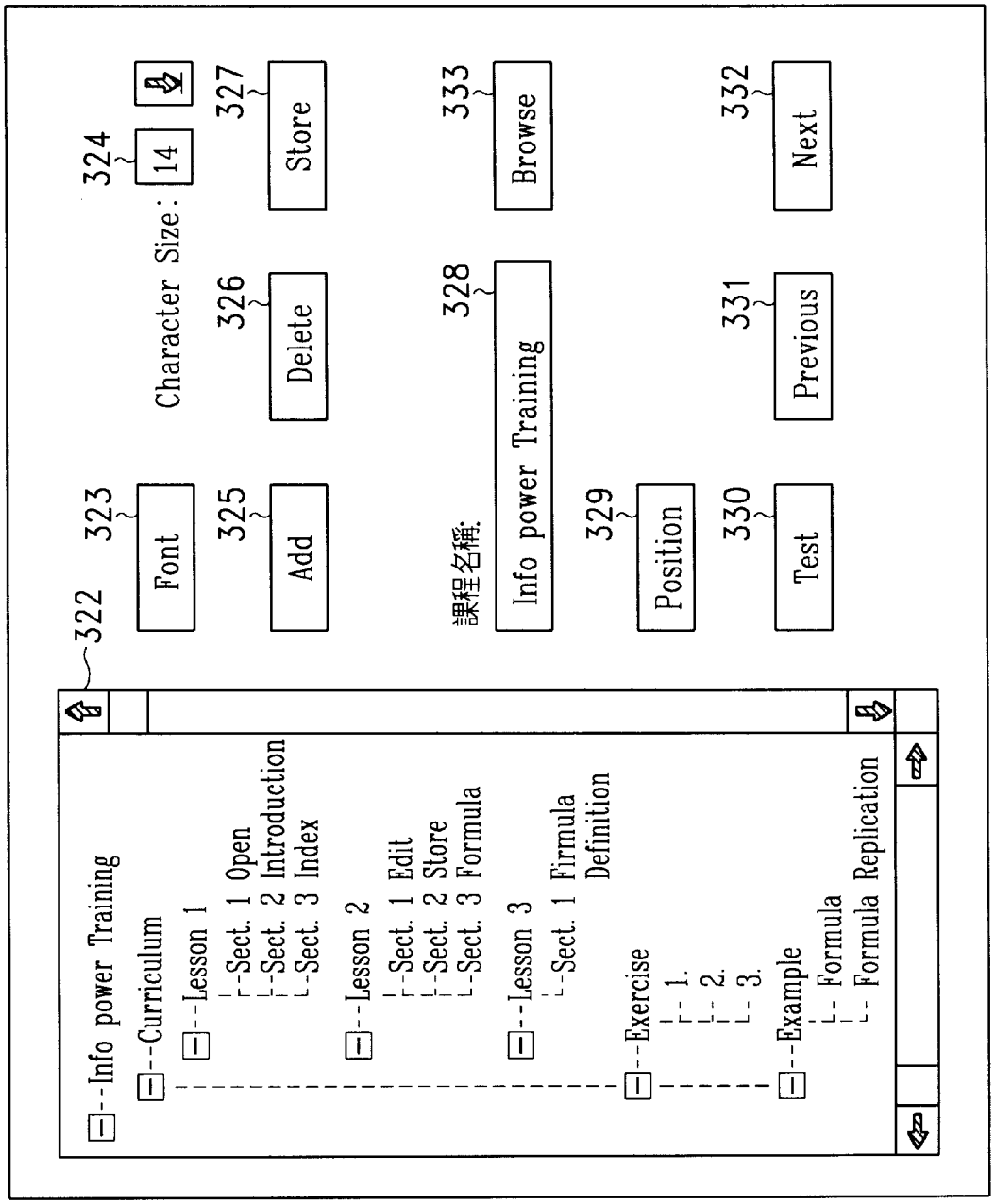
FIG. 3B shows an exemplary interface used for setting curriculum in connection with FIG. 3A.

FIG. 3B shows an exemplary interface used for setting curriculum in connection with FIG. 3A. This interface 321 is displayed after the curriculum setting procedure is activated (block 301, FIG. 3A), and includes an area 322 showing curriculum content, and an area 328 showing the title of the curriculum, which may be selected through browsing by a "browse" button 333. An area designated as "character size" 324 is used to select the size of the characters, and an area designated as "font" 323 is used to select one of available fonts. An "add" button 325 and a "delete" button 326 are used respectively for adding or deleting portion of the content. Further, a "position" button 329 is used to edit the content displayed in the area 322, and the test is performing after selecting a "test" button 330, wherein the test may be repeatedly performed until a satisfied result is met. A "store" button 327 initiates a storing function. Moreover, a "previous" button 331 is provided for returning to the previous setting step, i.e., the basic setting step 106 in FIG. 1, and a "next" button 332 is utilized to move to the next step, i.e., the video file inputting step, 108 in FIG. 1.

Figure 4A:
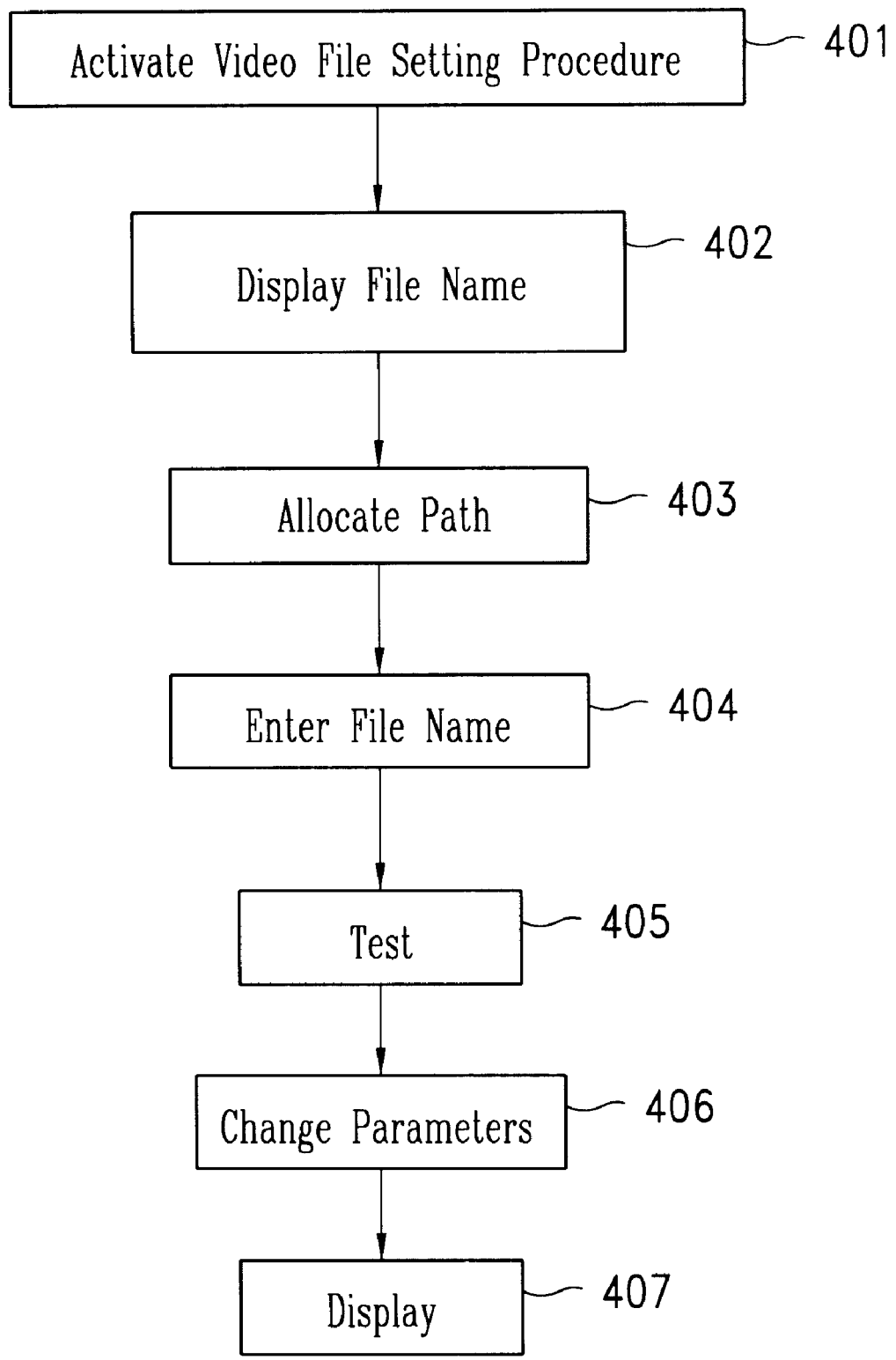
FIG. 4A shows a flow diagram further illustrating the video file inputting step 108 in FIG. 1.

FIG. 4A shows a flow diagram further illustrating the video file inputting step 108 in FIG. 1. After a video file setting procedure is activated (block 401), all video file names used in the multimedia training are displayed (block 402). The path of the required file is allocated (block 403), and the video file name is then entered (block 404), wherein the video file is, for example, a training curriculum recorded before. Next, a test (block 405) is performed, and some associated parameters, such as sound effect, play speed, or storing format, may be changed when necessary in block 406. Finally, the resulting setting is schematically displayed (block 407).

Figure 4B:
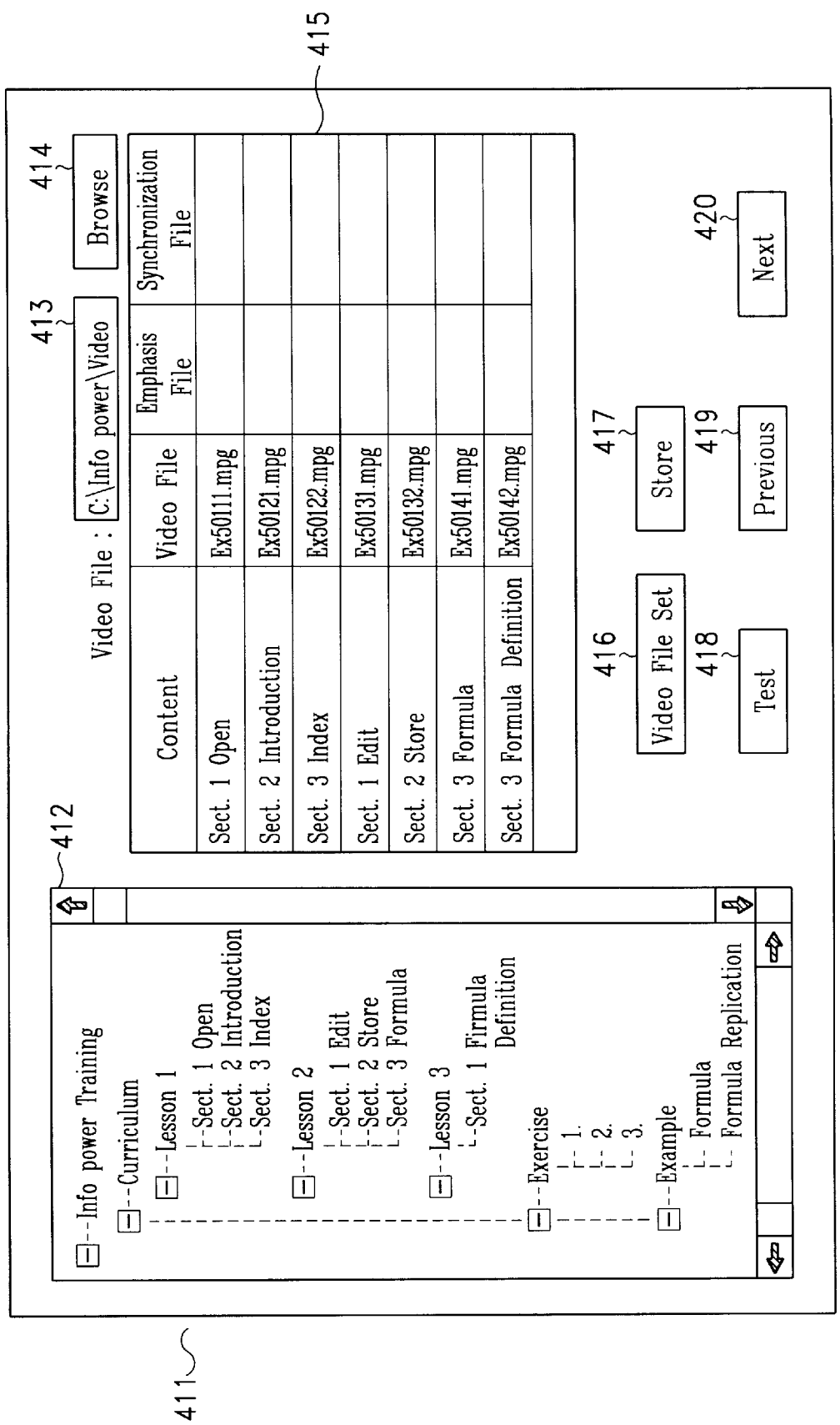
FIG. 4B shows an exemplary interface used for setting video file.

FIG. 4B shows an exemplary interface used for setting video file. This interface 411 is displayed after the video file setting procedure is activated (block 401, FIG. 4A), and includes an area 412 showing the curriculum content, and an area 413 showing the allocated path. A "browse" button 414 is used to select a video file corresponding to a section of the content as shown in a display area 415. For example, as shown in this diagram, under the path C:\Info_power\Video, the first section titled open corresponds to a file Ex50111.mpg. Further setting, such as sound effect, play speed, or storing format, in the video file may be made via a "video file set" button 416. The test is performing after selecting a "test" button 418, wherein the test may be repeatedly performed until a satisfied result is met. A "store" button 417 initiates a storing function. Moreover, a "previous" button 419 is provided for returning to the previous setting step, i.e., the curriculum setting step 107 in FIG. 1, and a "next" button 420 is utilized to move to the next step, i.e., the emphasis file inputting step 109 in FIG. 1.

Figure 5A:
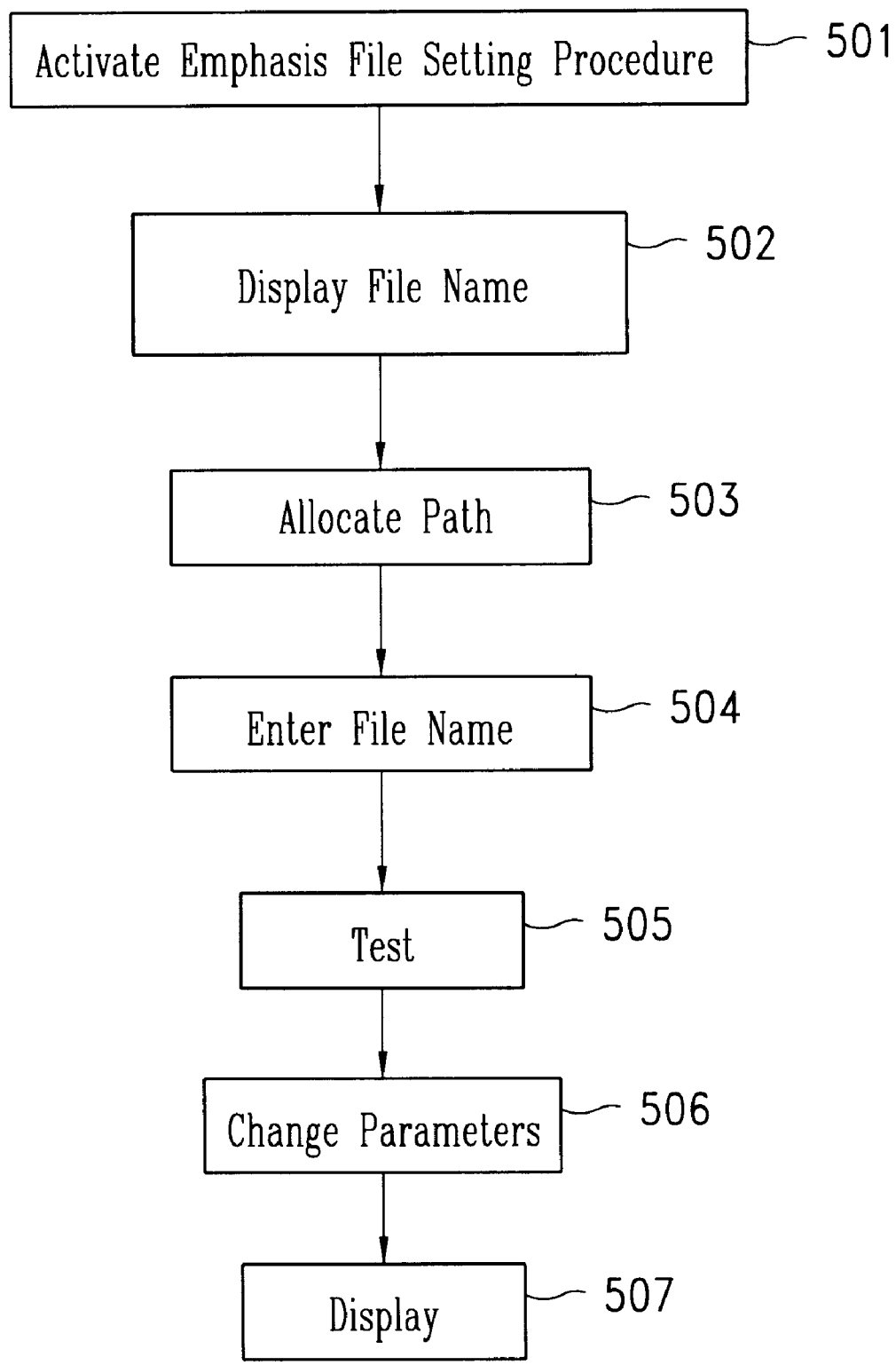
FIG. 5A shows a flow diagram further illustrating the emphasis file inputting step 109 in FIG. 1.

FIG. 5A shows a flow diagram further illustrating the emphasis file inputting step 109 in FIG. 1. After an emphasis file setting procedure is activated (block 501), all video file names used in the multimedia training are displayed (block 502). The path of the required emphasis file is allocated (block 503), and the emphasis file name is then entered (block 504), wherein the emphasis file is, for example, a character file synchronously used with a corresponding video file to provide points of emphasis. Next, a test (block 505) is performed, and some associated parameters, such as size and location of the characters may be changed when necessary in block 506. Finally, the resulting setting is schematically displayed (block 507).

Figure 5B:
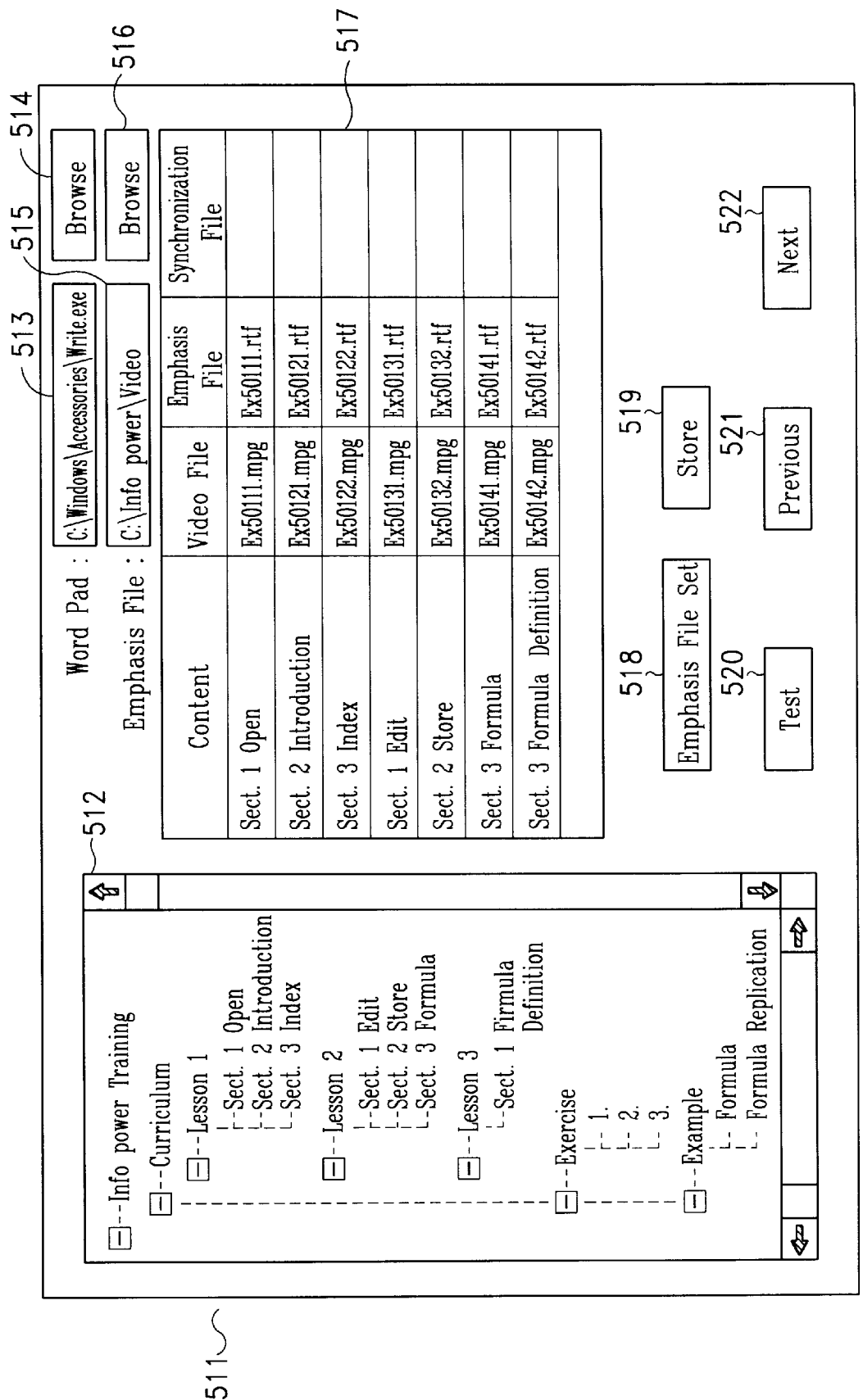
FIG. 5B shows an exemplary interface used for setting emphasis file.

FIG. 5B shows an exemplary interface used for setting emphasis file. This interface 511 is displayed after the emphasis file setting procedure is activated (block 501, FIG. 5A), and includes an area 512 showing the curriculum content, and an area 513 showing the associated file of the emphasis file, and an area 515 showing the allocated path. A "browse" button 514 is used to change the associated file of the emphasis file. Another "browse" button 516 is used to change the path of an emphasis file. Further setting, such as the size or location of the characters, in the emphasis file may be made via an "emphasis file set" button 518. The test is performing after selecting a "test" button 520, wherein the test may be repeatedly performed until a satisfied result is met. A "store" button 519 initiates a storing function. Moreover, a "previous" button 421 is provided for returning to the previous setting step, i.e., the video file inputting step 108 in FIG. 1, and a "next" button 522 is utilized to move to the next step, i.e., the synchronization file inputting step 110 in FIG. 1.

Figure 6A:
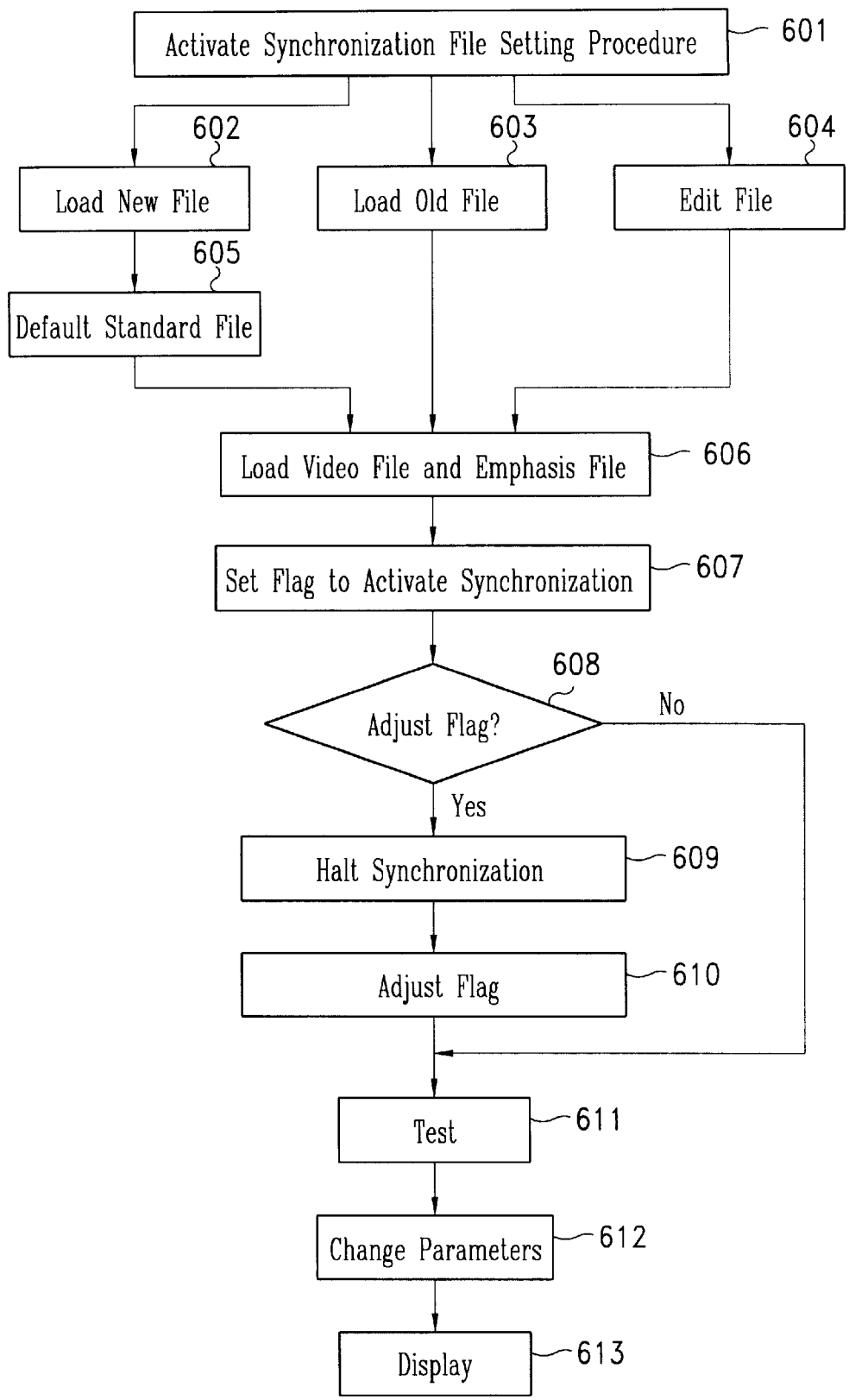
FIG. 6A shows a flow diagram further illustrating the synchronization file inputting step 110 in FIG. 1.

FIG. 6A shows a flow diagram further illustrating the synchronization file inputting step 110 in FIG. 1. After a synchronization file setting procedure is activated (block 601), a synchronization file is edited (block 604), so that the video file and the emphasis file can be played back synchronously. After the video file and the emphasis file are loaded (block 606), a flag is set to activate the synchronization (block 607), wherein the flag represents the playing time of the video file. Whenever the flag is required to be adjusted (block 608), the synchronization function mentioned above is temporarily halted (block 609), followed by adjusting the playing time of the video file (block 610). Micro adjustment may be used when necessary. For example, playing time of 30 seconds may be adjusted to 29 or 31 seconds, so that the precise synchronization could be attained. Next, a test (block 611) is performed, and some associated parameters, such as the flag or number of rows of the emphasis file may be changed when necessary in block 612. Finally, the resulting setting is schematically displayed (block 613). It is observed that the synchronization file under editing may be a new file (block 602) accompanied by a loaded default standard file for synchronization purpose (block 605). However, an old file may be used instead (block 603).

Figure 6B:
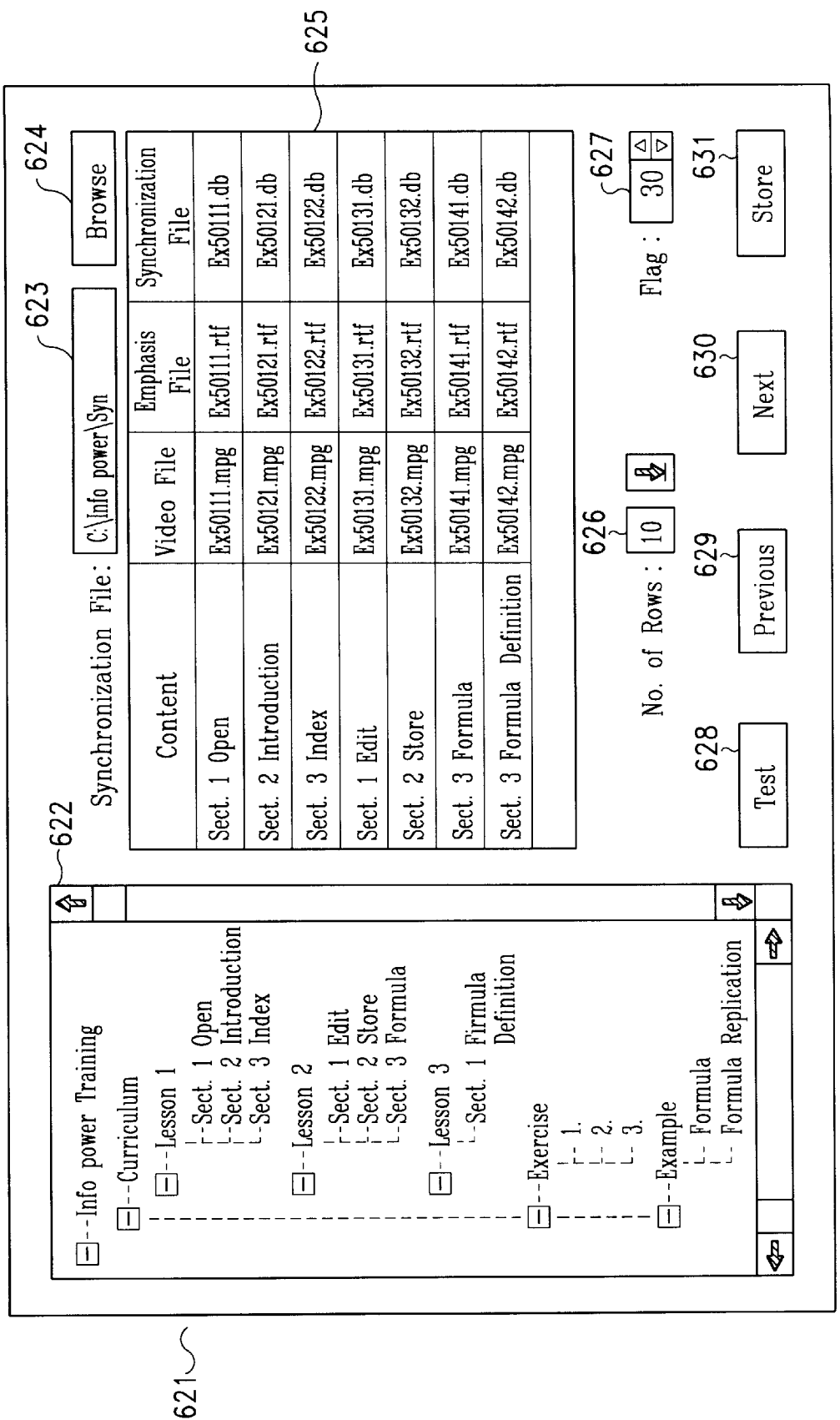
FIG. 6B shows an exemplary interface used for setting synchronization file.

FIG. 6B shows an exemplary interface used for setting synchronization file. This interface 621 is displayed after the synchronization file setting procedure is activated (block 601, FIG. 6A), and includes an area 622 showing the curriculum content, and an area 623 showing the allocated path. A "browse" button 624 is used to change the path of a synchronization file. A display area 625 is used for displaying the synchronization information between the various types of files. Furthermore, a file may be changed by directly entering its associated file name in this area. The number of rows of the emphasis file may be changed from an area 626, and flag can be adjusted from an area 627. The test is performing after selecting a "test" button 628, wherein the test may be repeatedly performed until a satisfied result is met. A "store" button 631 initiates a storing function. Moreover, a "previous" button 629 is provided for returning to the previous setting step, and a "next" button 630 is utilized to move to the next step.

The miscellaneous setting (111, FIG. 1) is then performed. In this embodiment, a question file is set to provide a suitable set of questions for learners. Information file may be further provided to give users warning or hint when necessary.

Figure 7A:
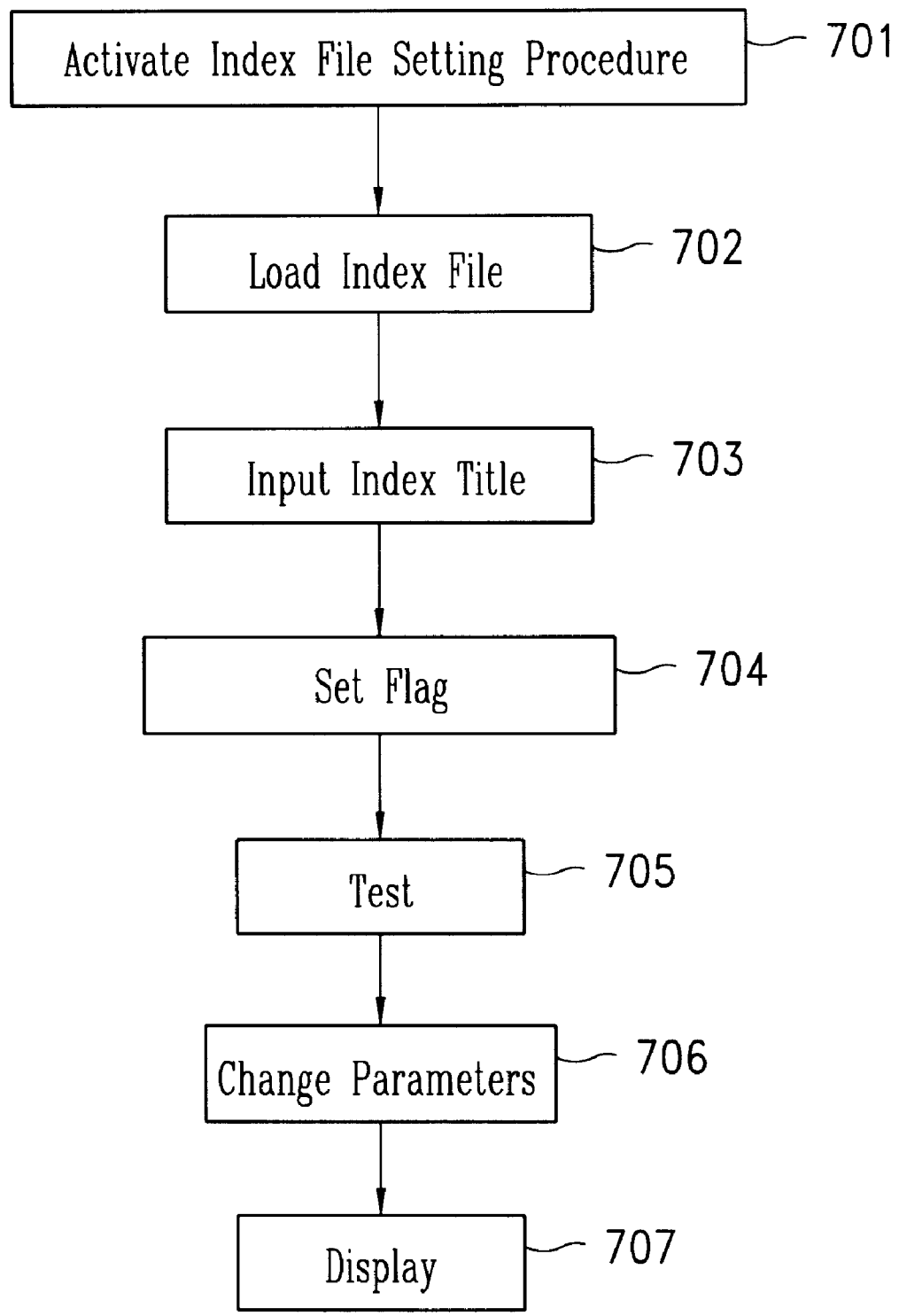
FIG. 7A shows index setting of the miscellaneous setting in FIG. 1.

Index setting is one of the various types of settings in the miscellaneous setting, and is shown in FIG. 7A. After the index file setting procedure is activated (block 701), an index file is loaded (block 702), followed by inputting or editing an index title (block 703). Next, the flag is set (block 704). Afterwards, a test (block 705) is performed, and some associated parameters, such as the position, size, or range of the index may be changed when necessary in block 706. Finally, the resulting setting is schematically displayed (block 707).

Figure 7B:
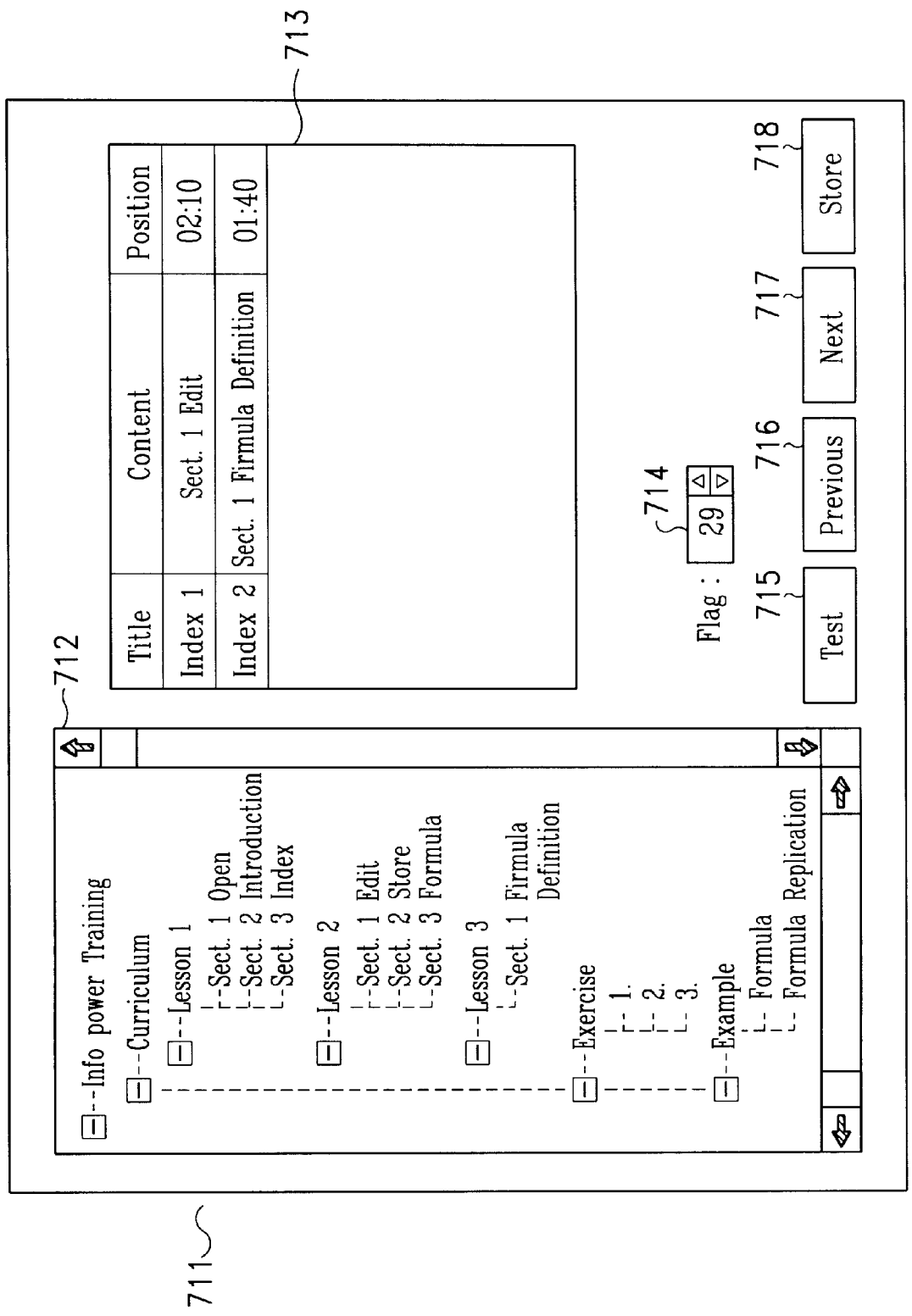
FIG. 7B shows an exemplary interface used for setting index file.

FIG. 7B shows an exemplary interface used for setting index file. This interface 711 is displayed after the index file setting procedure is activated (block 701, FIG. 7A), and includes an area 712 showing the curriculum content, and an area 713 showing index information, such as index titles, content, or the position of the content relative to the video file. Furthermore, a file may be changed by directly entering its associated file name in this area.

The change of the flag due to the modified index can be recovered by the adjustment via a flag area 714. The test is then performing after selecting a "test" button 715, wherein the test may be repeatedly performed until a satisfied result is met. A "store" button 718 initiates a storing function. Moreover, a "previous" button 716 is provided for returning to the previous setting step, and a "next" button 717 is utilized to move to the next step.

Figure 8:
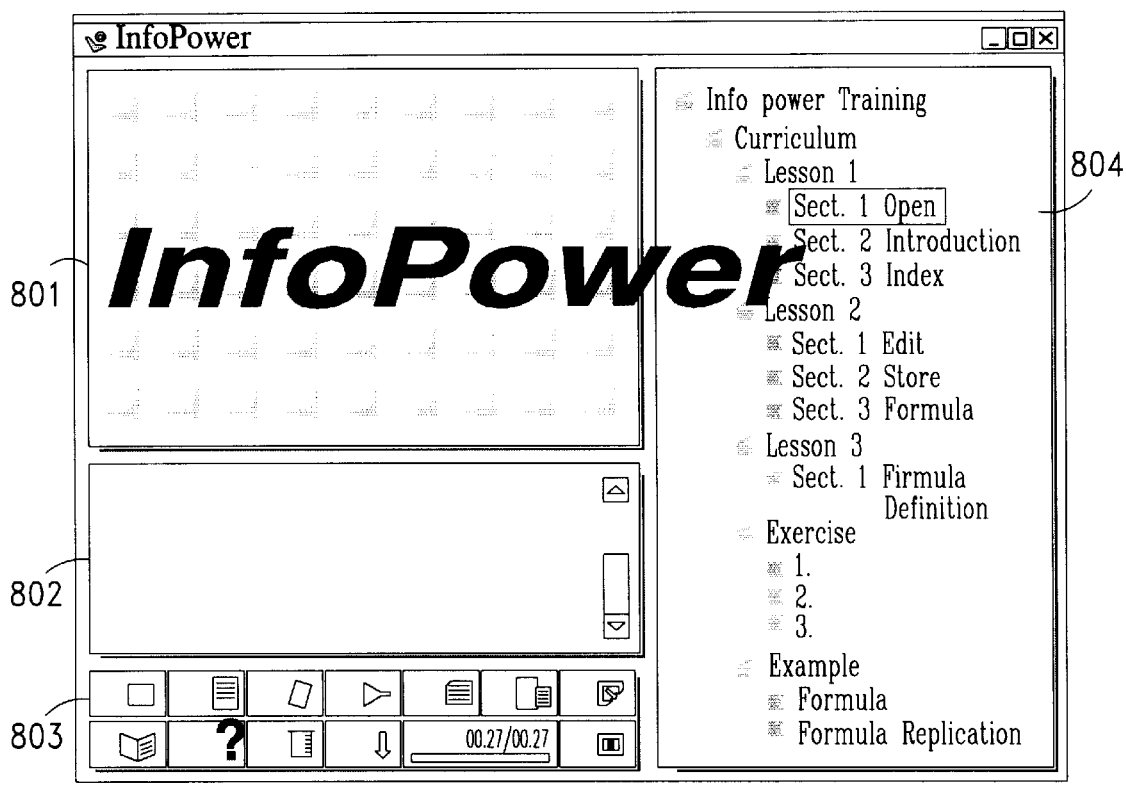
FIG. 8 shows a schematic of an exemplary interface of a multimedia training system in accordance with one embodiment of the present invention.

FIG. 8 shows a schematic of an exemplary interface of a multimedia training system in accordance with one embodiment of the present invention. The teaching material is played back in an area 801, and points of emphasis are displayed in an area 802, wherein the points are synchronized with the teaching material. An area 803 is used as a control area for providing various functions, such as halt, rewind, bookmark setting, and points replication. Work area 804 is used to show the content of the curriculum, make notes, or replicate points of emphasis by a word processor provided by this training system or by another vendor.

It is appreciated that each interface window can be modified according to users' need. Users could perform various settings without being acquainted with specific multimedia knowledge. Further, parameters in each setting can be conveniently changed, and the resulting setting can be view from the test function provided. Therefore, user anatomy is substantially perceived, and user transparency in modifying parameters during editing is also greatly felt.

It is further appreciated that the embodiment of the present invention may be easily adapted to a remote multimedia training via, for example, cable, internet, local area network, or wide area network.

To summarize the disclosure mentioned above, an example is briefly explained as follows. A new file is edited (block 101), and is named as "Infopower" (block 102). Next, default icons and characters are copied into this file (block 103), followed by setting colors, icons, and prompt windows (block 106, FIGS. 2A to 2E). After the content of the curriculum is edited (block 107, FIGS. 3A and 3B), video file and emphasis file are loaded (block 108, block 109, FIGS. 4A, 4B, 5A, and 5B), and thereafter synchronization is performed between the video file and the emphasis file (block 110, FIGS. 6A, and 6B). When necessary, miscellaneous settings (block 111, FIGS. 7A and 7B) may be further performed.

Although specific embodiments have been illustrated and described, it will be obvious to those skilled in the art that various modifications may be made without departing from the spirit which is intended to be limited solely by the appended claims.

What is claimed is:

1. An editing method in a multimedia synchronous training system, said method comprising:
   inputting a basic setting used in said multimedia synchronous training system;
   inputting a curriculum used in said multimedia synchronous training system;
   inputting multimedia teaching information;
   inputting points of emphasis by loading an emphasis file into said multimedia synchronous training system;
   setting a flag representing a playing duration of said multimedia teaching information for synchronizing said teaching information and said points of emphasis, where said flag is adjustable for slightly changing said playing duration of said multimedia teaching information, thereby matching said emphasis file with said multimedia teaching information; and
   performing miscellaneous settings in said multimedia synchronous training system.

2. The method according to claim 1, wherein said basic setting comprises color setting.

3. The method according to claim 2, wherein said color setting comprises background color, foreground color, and shading color settings.

4. The method according to claim 3, wherein each of said background color, said foreground color, and said shading color setting comprises contrast, saturation, brightness, and tone settings.

5. The method according to claim 4, further comprising a least a test in each of said contrast, said saturation, said brightness, and said tone settings.

6. The method according to claim 1, wherein said basic setting comprises editing icons and characters of a bubble.

7. The method according to claim 6, further comprising changing said icon and the location of said icon.

8. The method according to claim 7, further comprising at least a test in changing said icon and the location of said icon.

9. The method according to claim 6, further comprising changing font and size of said characters.

10. The method according to claim 9, further comprising at least a test in changing the font and the size of said characters.

11. The method according to claim 1, wherein said step of inputting said curriculum comprises adding, deleting, and moving a section of said curriculum.

12. The method according to claim 11, further comprising arranging content of said curriculum.

13. The method according to claim 1, wherein said multimedia teaching information comprises video and audio teaching information.

14. The method according to claim 13, wherein said step of inputting said multimedia teaching information comprises editing said video and audio teaching information.

15. The method according to claim 14, further comprising at least a test in editing said video and audio teaching information.

16. The method according to claim 1, wherein said points of emphasis comprise emphasis of said multimedia teaching information.

17. The method according to claim 16, wherein said step of inputting said points of emphasis comprises editing the emphasis of said multimedia teaching information.

18. The method according to claim 17, further comprising at least a test in editing the emphasis of said multimedia teaching information.

19. The method according to claim 18, wherein said step of editing the emphasis of said multimedia teaching information comprises setting font, size, and number of rows of said emphasis of said multimedia teaching information.

20. The method according to claim 19, further comprising at least a test in setting the font, the size, and the number of rows of said emphasis of said multimedia teaching information.

21. The method according to claim 1, wherein said miscellaneous setting comprises setting information, questions, and examples.

22. The method according to claim 1, wherein said miscellaneous setting comprises setting index of said curriculum.

23. The method according to claim 1, wherein said step of setting index of said curriculum comprises setting a flag to synchronize said teaching information and said points of emphasis.

24. The method according to claim 23, further comprising at least a test in setting the flag to synchronize said teaching information and said points of emphasis.

25. The method according to claim 1, wherein said multimedia synchronous training system is communicated via one of following systems: local area network, wide area network, internet, and cable.

* * * * *